United States Patent
Lin et al.

(10) Patent No.: US 9,300,393 B2
(45) Date of Patent: Mar. 29, 2016

(54) SYSTEMS AND METHODS FOR DATA RELAY TRANSMISSION

(75) Inventors: Tzu-Ming Lin, Jhubei (TW); Chien-Min Lee, Xinzhuang (TW)

(73) Assignee: Industrial Technology Research Institute, Hsinchu (TW)

( * ) Notice: Subject to any disclaimer, the term of this patent is extended or adjusted under 35 U.S.C. 154(b) by 221 days.

(21) Appl. No.: 12/914,208

(22) Filed: Oct. 28, 2010

(65) Prior Publication Data

US 2011/0164536 A1 Jul. 7, 2011

Related U.S. Application Data

(60) Provisional application No. 61/292,235, filed on Jan. 5, 2010.

(51) Int. Cl.
*H04B 7/26* (2006.01)
*H04B 7/155* (2006.01)
*H04L 12/66* (2006.01)

(52) U.S. Cl.
CPC .............. *H04B 7/2606* (2013.01); *H04B 7/155* (2013.01); *H04L 12/66* (2013.01)

(58) Field of Classification Search
CPC .. H04B 7/155; H04B 7/2606; H04B 7/15507; H04B 7/15542; H04L 12/66; H04L 5/003; H04L 5/0091; H04W 72/04; H04W 72/048; H04W 84/047; H04W 88/04
See application file for complete search history.

(56) References Cited

U.S. PATENT DOCUMENTS

| | | | |
|---|---|---|---|
| 2010/0120442 A1* | 5/2010 | Zhuang et al. | 455/450 |
| 2010/0279628 A1* | 11/2010 | Love et al. | 455/70 |
| 2011/0128883 A1* | 6/2011 | Chung et al. | 370/252 |
| 2011/0176477 A1* | 7/2011 | Lee et al. | 370/315 |
| 2011/0194412 A1* | 8/2011 | Park et al. | 370/241 |
| 2011/0194523 A1* | 8/2011 | Chung et al. | 370/329 |
| 2012/0063386 A1* | 3/2012 | Park | H04B 7/155 370/315 |
| 2012/0163287 A1* | 6/2012 | Raaf et al. | 370/315 |
| 2013/0194931 A1* | 8/2013 | Lee | H04L 5/0053 370/241 |
| 2013/0250906 A1* | 9/2013 | Golitschek | H04W 72/042 370/330 |

OTHER PUBLICATIONS

3GPP TS 36.216 v1.0.0, 3rd Generation Partnership Project; Technical Specification Group Radio Access Network; Evolved Universal Terrestrial Radio Access (E-UTRA); Physical layer for relaying operation (Release 10), dated Sep. 2010.

* cited by examiner

*Primary Examiner* — Yee Lam
(74) *Attorney, Agent, or Firm* — Finnegan, Henderson, Farabow, Garrett & Dunner LLP

(57) ABSTRACT

A method for a base station to transmit data, the data to be relayed by a relay station to user equipment, the method including: encoding, based on an identification of the relay station or an identification of the user equipment, control information that indicates resource allocation for the relay station; and transmitting the control information to the relay station.

36 Claims, 17 Drawing Sheets

1100

| PDCCH Length Type | Number of CCEs | Number of Resource Element Groups | Number of PDCCH Bits |
|---|---|---|---|
| 0 | 1 | 9 | 72 |
| 1 | 2 | 18 | 144 |
| | | | |
| 2 | 4 | 36 | 288 |
| | | | |
| | | | |
| | | | |
| 3 | 8 | 72 | 576 |

For Use by RS

For Use by UE

1000

- Format Type
- UE Identifier
  - Used to specify UE, e.g. RNTI, LCID, connection ID
- Subframe Index
  - Indicate the subframe for relay transmission
- RB Assignment
  - Indicate the resource allocation
- MCS
  - Indicate the used MCS
- Redundancy Version
  - Indicate redundancy version
- New Data Indicator
  - Indicate the data is new data or old data (retransmission)
- TPC Command for Data
- Preamble Index
- Cyclic Shift for Demodulation Reference Signal
- Uplink Assignment Index
- Downlink Assignment Index
- CQI Request
- HARQ Process Number
- Transport Block Size (or Index)
- Transport Block to Codeword Swap Flag
- Power Offset

Fig. 10

| PDCCH Length Type | Number of CCEs | Number of Resource Element Groups | Number of PDCCH Bits |
|---|---|---|---|
| 0 | 1 | 9 | 72 |
| 1 | 2 | 18 | 144 |
|  | 3 | 27 | 216 |
| 2 | 4 | 36 | 288 |
|  | 5 | 45 | 360 |
|  | 6 | 54 | 432 |
|  | 7 | 63 | 504 |
| 3 | 8 | 72 | 576 |

SYSTEMS AND METHODS FOR DATA RELAY TRANSMISSION

RELATED APPLICATIONS

This application is based upon and claims the benefit of priority from U.S. Provisional Patent Application No. 61/292,235, filed Jan. 5, 2010, the entire contents of which are incorporated herein by reference.

TECHNICAL FIELD

This disclosure relates to systems and methods for data relay transmission in a communication system.

BACKGROUND

In wireless communications, a base station may transmit data to user equipment directly, or through a relay station. The base station may have a cell with a cell identification, and in the cell the user equipment may receive data from the base station. Although the relay station generally does not have a separate cell identification and thus may not create a cell, the relay station may relay data received from the base station to the user equipment.

Traditionally, the base station may transmit to the user equipment data and control information that indicates resource, e.g., time or frequency resource, allocation for the user equipment to receive the data, on different communication channels. For example, according to the Long Term Evolution (LTE) standard, the base station, also known as an Enhanced Node B (eNB) in the LTE standard, may transmit to the user equipment the control information on a physical downlink control channel (PDCCH) and the data on a physical downlink shared channel (PDSCH). Based on the control information received on the PDCCH, the user equipment may determine allocated resources to receive the data on the PDSCH.

The relay station may assist the base station to transmit data to the user equipment by relaying data received from the base station to the user equipment. The base station may transmit to the relay station data to be relayed and control information that indicates resource allocation for the relay station to receive the data to be relayed, on different communication channels. For example, according to the LTE standard, the base station may transmit to the relay station, also known as a relay node (RN) in the LTE standard, the control information on the PDCCH and the data to be relayed on the PDSCH. Based on the control information received on the PDCCH, the relay station may determine allocated resources to receive the data on the PDSCH.

FIG. 1 illustrates a traditional method 100 for the base station to transmit control information to the relay station or the user equipment, according to the LTE standard. Referring to FIG. 1, the base station appends cyclic redundancy check (CRC) parity bits to each of a plurality of pieces of Downlink Control Information, referred to herein as DCIs 102. Each of the DCIs 102 may have a predetermined format according to the LTE standard. The base station then precodes the DCIs each into multiple control channel elements (CCEs) 104. After physical processing, e.g., channel coding, the CCEs may be mapped onto the PDCCH and be transmitted in a subframe 106, based on, e.g., an orthogonal frequency-division multiplexing (OFDM) technique.

The OFDM technique uses a plurality of closely-spaced orthogonal subcarriers to carry data. For example, the data may be allocated on a plurality of parallel data channels, one for each of the subcarriers. Each of the subcarriers may be modulated with a conventional modulation scheme, e.g., quadrature amplitude modulation, at a relatively low symbol rate. In addition, based on the OFDM technique, an inverse fast Fourier transform (IFFT) may be performed on OFDM symbols representing the data on a transmitter side of the OFDM based communication system, and a fast Fourier transform (FFT) may be performed to recover the OFDM symbols on a receiver side of the OFDM based communication system.

Still referring to FIG. 1, the subframe 106 may include N1 OFDM symbols corresponding to one downlink slot and N2 subcarriers. The subframe 106 may also include resource blocks each corresponding to N1 OFDM symbols and N3 subcarriers. Each resource element (k, l) in a resource block corresponds to a time and frequency resource on which data is transmitted.

FIG. 2 illustrates a traditional blind decoding method 200 for the relay station or the user equipment, referred to herein as the receiver, to receive control information from the base station, according to the LTE standard. Referring to FIG. 2, the receiver receives the control information in the form of CCEs 202 on the PDCCH. Due to uncertainty of correspondence between the CCEs 202 and DCIs to be recovered, the receiver may try different lengths, e.g., Length1, Length2, . . . , of candidate DCIs such as a candidate DCI 204. The receiver further descrambles CRC parity bits of the candidate DCI 204. If descrambled CRC parity bits 206 pass CRC check, the candidate DCI 204 is a correctly recovered DCI 208. Otherwise, the receiver may continue to try a different length of candidate DCI for CRC check.

SUMMARY

According to a first aspect of the present disclosure, there is provided a method for a base station to transmit data, the data to be relayed by a relay station to user equipment, the method comprising: encoding, based on an identification of the relay station or an identification of the user equipment, control information that indicates resource allocation for the relay station; and transmitting the control information to the relay station.

According to a second aspect of the present disclosure, there is provided a method for a base station to transmit to a relay station control information for relaying data to user equipment, comprising: transmitting to the relay station a specific indication message, wherein the message includes control information that indicates resource allocation for the relay station and a parameter indicating that the control information is for use by the relay station.

According to a third aspect of the present disclosure, there is provided a method for a base station to transmit control information to user equipment and to a relay station for relaying data to the user equipment, comprising: encoding control information that indicates resource allocation for the relay station based on a first number of control channel elements (CCEs); and encoding control information that indicates resource allocation for the user equipment based on a second number of CCEs different from the first number.

According to a fourth aspect of the present disclosure, there is provided a method for a base station to transmit control information to user equipment and to a relay station for relaying data to the user equipment, comprising: scrambling, with an identification of the relay station, a first plurality of cyclic redundancy check (CRC) parity bits for control information that indicates resource allocation for the relay station; and scrambling, with an identification of the user equipment, a second plurality of CRC parity bits for control information that indicates resource allocation for the user equipment.

According to a fifth aspect of the present disclosure, there is provided a method for a relay station to receive data from a base station and to relay the data to user equipment, comprising: receiving, from the base station, control information that indicates resource allocation for the relay station, the control information being encoded based on an identification of the relay station or an identification of the user equipment; and decoding the control information to determine allocated resources for the relay station.

According to a sixth aspect of the present disclosure, there is provided a method for a relay station to receive from a base station control information for relaying data to user equipment, comprising: receiving from the base station a specific indication message, wherein the message includes control information that indicates resource allocation for the relay station and a parameter indicating that the control information is for use by the relay station.

According to a seventh aspect of the present disclosure, there is provided a method for a relay station to receive control information from a base station, wherein the base station transmits control information that indicates resource allocation for user equipment based on a first number of control channel elements (CCEs), the method comprising: receiving from the base station control information that indicates resource allocation for the relay station; and decoding the received control information based on a second number of CCEs different from the first number.

According to an eighth aspect of the present disclosure, there is provided a method for a relay station to receive control information from a base station, wherein the base station scrambles, with an identification of user equipment, a first plurality of cyclic redundancy check (CRC) parity bits for control information that indicates resource allocation for the user equipment, the method comprising: receiving from the base station control information that indicates resource allocation for the relay station; and descrambling, with an identification of the relay station, a second plurality of CRC parity bits for the received control information.

According to a ninth aspect of the present disclosure, there is provided a base station to transmit data, the data to be relayed by a relay station to user equipment, the base station comprising: a processor configured to encode, based on an identification of the relay station or an identification of the user equipment, control information that indicates resource allocation for the relay station; and an antenna configured to transmit the control information to the relay station.

According to a tenth aspect of the present disclosure, there is provided a relay station to receive data from a base station and to relay the data to user equipment, comprising: an antenna configured to receive, from the base station, control information that indicates resource allocation for the relay station, the control information being encoded based on an identification of the relay station or an identification of the user equipment; and a processor configured to decode the control information to determine allocated resources for the relay station.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

FIG. 10 illustrates a specific indication message for a base station to transmit control information to a relay station, according to an exemplary embodiment.

FIG. 11 illustrates an encoding method for a base station to transmit control information to a relay station and user equipment, according to an exemplary embodiment.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of systems and methods consistent with aspects related to the invention as recited in the appended claims.

Figure 3:
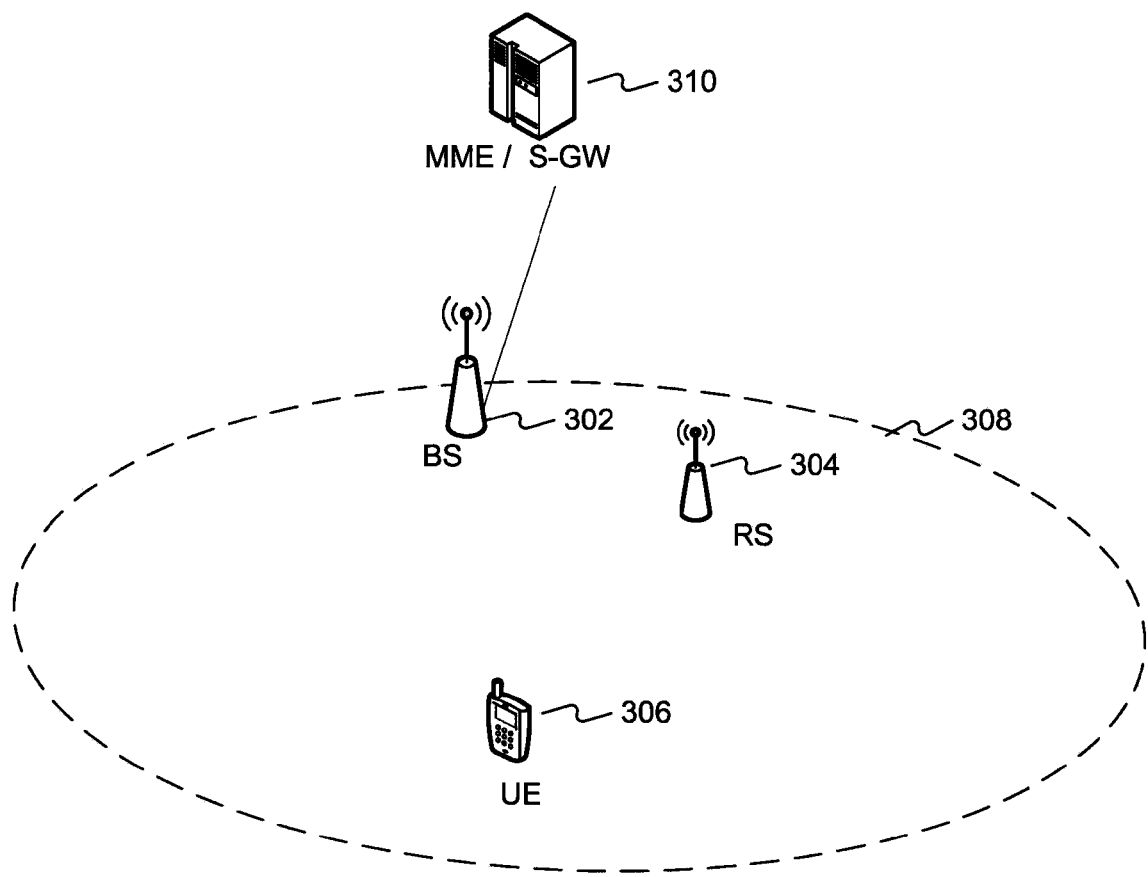
FIG. 3 illustrates a block diagram of a communication system for data relay transmission, according to an exemplary embodiment.

FIG. 3 illustrates a block diagram of a communication system 300 for data relay transmission, according to an exemplary embodiment. The communication system 300 may be configured to operate based on, e.g., an orthogonal frequency-division multiplexing (OFDM) technique, a code division multiple access (CDMA) technique, a multiple-carrier technique, a multiple-input and multiple-output (MIMO) technique, etc.

In exemplary embodiments, the communication system 300 may be configured to operate in accordance with different communication standards such as the IEEE 802.16 family of standards, the 3rd Generation Partnership Project (3GPP) standard, the High-Speed Packet Access (HSPA) standard, the Long Term Evolution (LTE) standard, the International Mobile Telecommunications-2000 (IMT-2000) standard, the IMT-Advance standard, the IMT family of standards, etc. For illustrative purposes only, it is assumed that the communication system 300 is configured to operate in accordance with the LTE standard and based on the OFDM technique.

In exemplary embodiments, the communication system 300 may include at least one base station (BS) 302, also known as an Enhanced Node B (eNB), at least one relay station (RS) 304, also known as a relay node (RN), and at least one user equipment (UE) 306. The RS 304 and the UE 306 are in a cell 308, i.e., a coverage area, of the BS 302.

In exemplary embodiments, the communication system 300 may further include a communication device 310 connected to the BS 302. The communication device 310 may include a mobility management entity (MME) and/or a serving gateway (S-GW), which manage and control communications in the communication system 300. As a result, the UE 306 may communicate with the BS 302 and the communication device 310 to receive, e.g., LTE services.

In exemplary embodiments, the BS 302 may transmit data to, or receive data from, the UE 306 directly or through the RS 304. For example, the BS 302 may transmit data to the RS 304, and the RS 304 then relays the data to the UE 306. Also for example, the UE 306 may receive data directly from the BS 302, or through the RS 304, or simultaneously from the BS 302 and the RS 304.

In exemplary embodiments, the BS 302 may transmit to the UE 306 data and control information that indicates resource, e.g., time or frequency resource, allocation for the UE 306 to receive the data on different communication channels. For example, the BS 302 may transmit to the UE 306 the control information on a physical downlink control channel (PDCCH) and the data on a physical downlink shared channel (PDSCH). Based on the control information received on the PDCCH, the UE 306 may determine allocated resources to receive the data on the PDSCH.

In exemplary embodiments, the BS 302 may transmit to the RS 304 data to be relayed to the UE 306 and control information that indicates resource allocation for the RS 304 to receive the data to be relayed on different communication channels. For example, the BS 302 may transmit to the RS 304 the control information on the PDCCH and the data to be relayed on the PDSCH. Based on the control information received on the PDCCH, the RS 304 may determine allocated resources to receive the data to be relayed on the PDSCH.

In exemplary embodiments, the RS 304 may relay the data to the UE 306, and the BS 302 may transmit to the UE 306 control information that indicates resource allocation for the UE 306 to receive the data relayed from the RS 304. For example, the RS 304 may relay the data to the UE 306 on the PDSCH, and the BS 302 may transmit the control information to the UE 306 on the PDCCH. Based on the control information received on the PDCCH, the UE 306 may determine allocated resources to receive the data on the PDSCH. In addition, the BS 302 may also simultaneously transmit the data to the UE 306 on the PDSCH.

In exemplary embodiments, the RS 304 may transmit or receive radio signals based on a time division multiplex (TDM) technique or a frequency division multiplex (FDM) technique in an uplink or downlink band of the BS 302. In addition, the RS 304 may act as a BS and transmit control information and data to the UE 306 without coordination with the BS 302.

Figure 4:
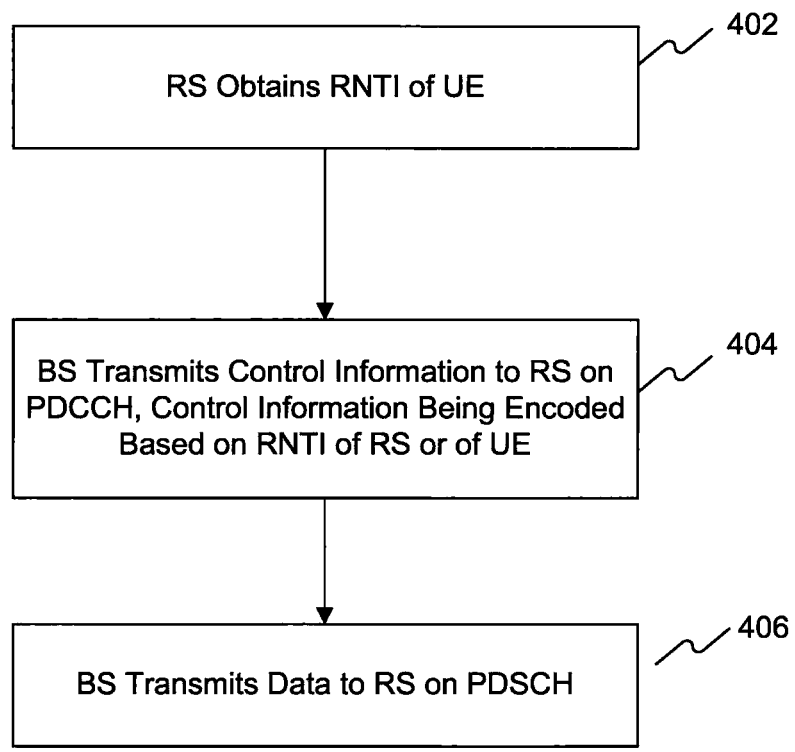
FIG. 4 illustrates a flowchart of a method for a base station to transmit data to a relay station, according to an exemplary embodiment.

FIG. 4 illustrates a flowchart of a method 400 for the BS 302 (FIG. 3) to transmit data to the RS 304, according to an exemplary embodiment. For example, the data may be data to be relayed to the UE 306 (FIG. 3). Referring to FIGS. 3 and 4, the RS 304 obtains an identification, e.g., a radio network temporary identifier (RNTI), of the UE 306 through dedicated signaling from the BS 302, or by snooping messages exchanged between the BS 302 and the UE 306 (402). For example, the dedicated signaling may include media access control (MAC) signaling, radio link control (RLC) signaling, radio resource control (RRC) signaling, or non-access stratum (NAS) messaging. Also for example, the messages exchanged between the BS 302 and the UE 306 may include a random access request (RAR) message in a random access procedure or any other message that includes information regarding the identification, e.g., the RNTI, of the UE 306. As a result, the RS 304 obtains the RNTI of the UE 306.

The BS 302 transmits on the PDCCH control information that indicates resource allocation for the RS 304 to receive data (404). In one exemplary embodiment, the BS 302 encodes the control information based on an identification, e.g., an RNTI, of the RS 304. Accordingly, the RS 304 may use its own RNTI to decode the control information to determine allocated resources for receiving the data. In one exemplary embodiment, the BS 302 encodes the control information based on the RNTI of the UE 306. Accordingly, the RS 304 may use the obtained RNTI of the UE 306 to decode the control information to determine allocated resources for receiving the data.

The BS 302 further transmits the data to the RS 304 on the PDSCH. As a result, the RS 304 may receive the data from the BS 302 on the determined resources. In some exemplary embodiments, the communication system 300 may include multiple UEs. Accordingly, the RS 304 may differentiate data on the PDSCH for each individual UE. In addition, the RS 304 may perform advanced transmission, e.g., using beam forming or MIMO techniques, for the UEs.

In addition, the RS 304 may also receive from the BS 302 control information that indicates resource allocation for the RS 304 to relay the data to the UE 306. For example, the RS 304 may receive that control information on the PDCCH or the PDSCH. Also for example, the RS 304 may receive that control information through dedicated signaling, such as physical layer (PHY) messaging, MAC messaging, or RRC messaging between the BS 302 and the RS 304. After the RS 304 receives the data to be relayed to the UE 306 and the control information for relaying the data, the RS 304 may relay the data to the UE 306 on allocated resources.

Figure 5:
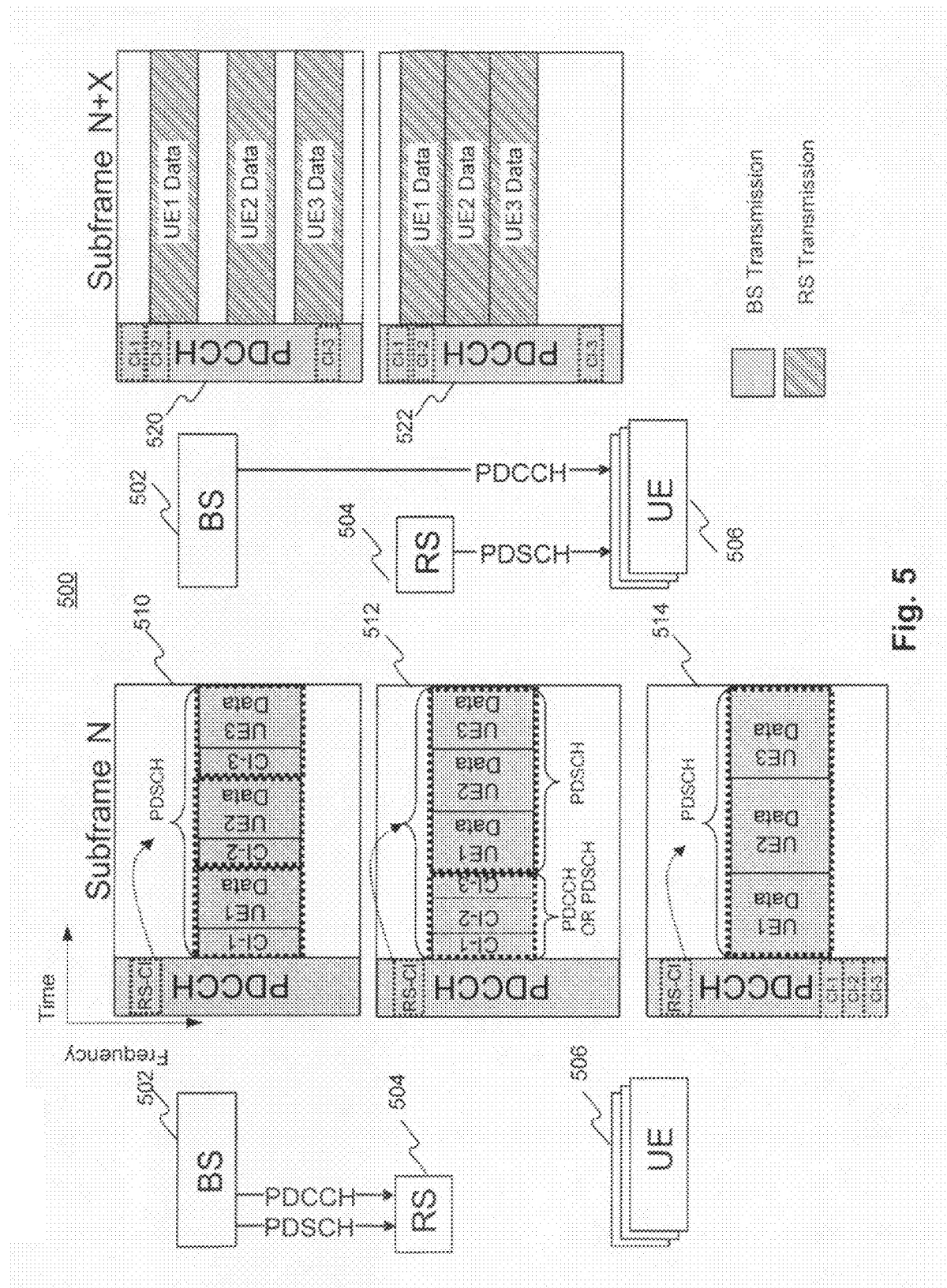
FIG. 5 illustrates a relay transmission process for a relay station to relay data received from a base station to user equipment, according to an exemplary embodiment.

FIG. 5 illustrates a relay transmission process 500 for an RS 504 to relay data received from a BS 502 to UEs 506, according to an exemplary embodiment. For illustrative purposes only, it is assumed that the UEs 506 include a first UE UE1, a second UE UE2, and a third UE UE3. For example, the BS 502, the RS 504, and UE1 may be the BS 302, the RS 304, and the UE 306 (FIG. 3), respectively.

In exemplary embodiments, the BS 502 encodes control information that indicates resource allocation for the RS 504 to receive data with an RNTI of the RS 504, referred to herein as RS-CI. The BS 502 further transmits the RS-CI to the RS 504 on a PDCCH and transmits the data to the RS 504 on a PDSCH in subframe N based on a subframe format 510. Based on the subframe format 510, the data on the PDSCH includes data to be relayed to UE1, UE2, and UE3, referred to herein as UE1 data, UE2 data, and UE3 data, respectively, and control information that indicates resource allocation for the RS 504 to relay the UE1 data, the UE2 data, and the UE3 data, referred to herein as CI-1, CI-2, and CI-3, respectively. By receiving and decoding the RS-CI, the RS 504 may receive the PDSCH and, hence, the UE1 data, the UE2 data, the UE3 data, the CI-1, the CI-2, and the CI-3.

In one exemplary embodiment, the BS 502 transmits the RS-CI to the RS 504 on the PDCCH and transmits the data to the RS 504 on the PDSCH, in subframe N based on a subframe format 512. Based on the subframe format 512, the CI-1, the CI-2, and the CI-3 are aggregated in a first dedicated resource block on the PDCCH or the PDSCH, and the UE1 data, the UE2 data, and the UE3 data are aggregated in a second dedicated resource block on the PDSCH.

In one exemplary embodiment, the BS 502 transmits the RS-CI to the RS 504 on the PDCCH and transmits the data to the RS 504 on the PDSCH, in subframe N based on a subframe format 514. Based on the subframe format 514, the data on the PDSCH includes the UE1 data, the UE2 data, and the UE3 data, and the CI-1, the CI-2, and the CI-3 are transmitted on the PDCCH.

In exemplary embodiments, in a subframe transmitted after subframe N, e.g., subframe N+X, the BS 502 may transmit the CI-1, the CI-2, and the CI-3 to UE1, UE2, and UE3, respectively, and the RS 504 may relay the UE1 data, the UE2 data, and the UE3 data on allocated resources determined based on the CI-1, the CI-2, and the CI-3 that the RS 504 receives in subframe N. As a result, based on the CI-1, the CI-2, and the CI-3 received in subframe N+X, UE1, UE2, and UE3 may respectively determine allocated resources for receiving the UE1 data, the UE2 data, and the UE3 data relayed from the RS 504. FIG. 5 shows exemplary subframe formats 520 and 522 for subframe N+X.

Figure 6:
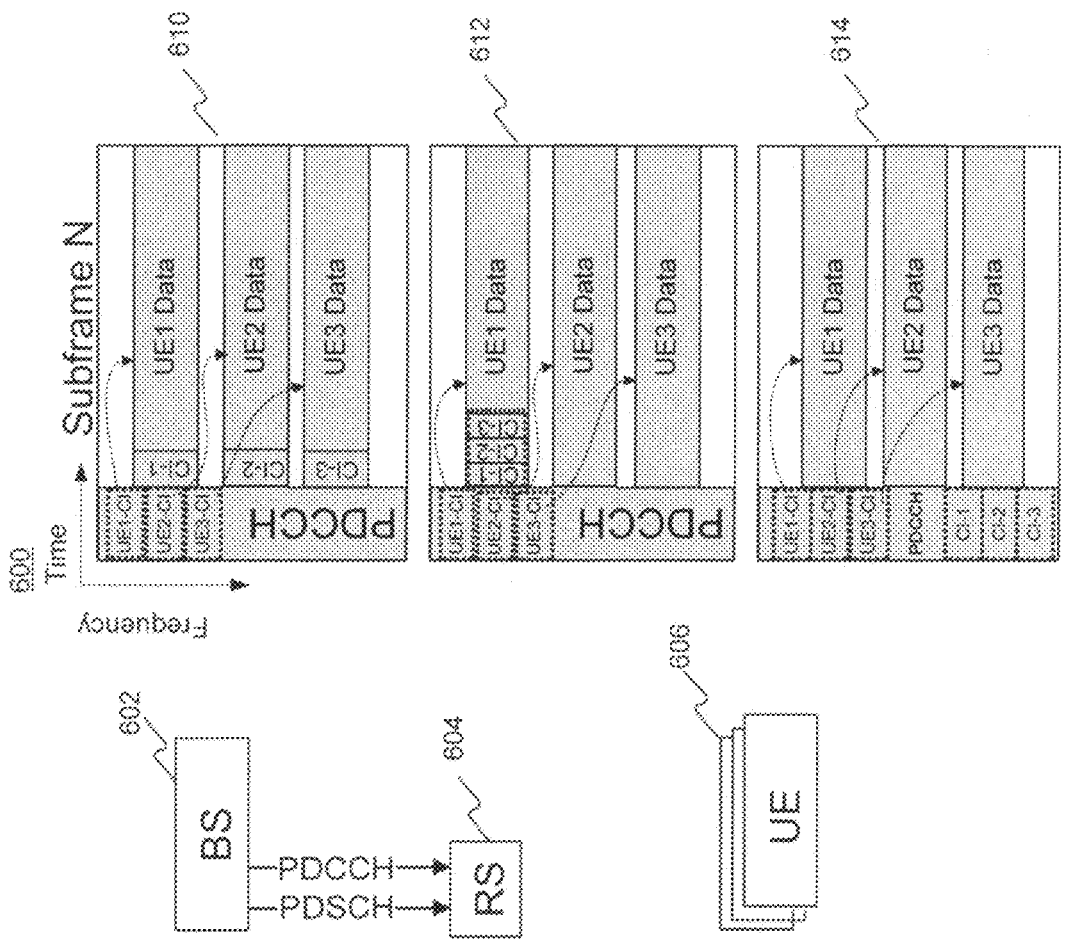
FIG. 6 illustrates a relay transmission process for a relay station to relay data received from a base station to user equipment, according to an exemplary embodiment.

FIG. 6 illustrates a relay transmission process 600 for an RS 604 to relay data received from a BS 602 to UEs 606, according to an exemplary embodiment. For illustrative purposes only, it is assumed that the UEs 606 include a first UE UE1, a second UE UE2, and a third UE UE3. For example, the BS 602, the RS 604, and UE1 may be the BS 302, the RS 304, and the UE 306 (FIG. 3), respectively.

In exemplary embodiments, the BS 602 encodes control information that indicates resource allocation for the RS 604 to receive data relating to UE1, UE2, and UE3 with respective RNTIs of UE1, UE2, and UE3, the control information being referred to herein as UE1-CI, UE2-CI, and UE3-CI, respectively. The BS 602 further transmits the UE1-CI, the UE2-CI, and the UE3-CI to the RS 604 on a PDCCH and transmits the data to the RS 604 on a PDSCH, in subframe N based on a subframe format 610. Based on the subframe format 610, the data on the PDSCH includes data to be relayed to UE1, UE2, and UE3, referred to herein as UE1 data, UE2 data, and UE3 data, respectively, and control information that indicates resource allocation for the RS 604 to relay the UE1 data, the UE2 data, and the UE3 data, referred to herein as CI-1, CI-2, and CI-3, respectively. By receiving and decoding the UE1-CI, the UE2-CI, and the UE3-CI, the RS 604 may receive the PDSCH and, hence, the UE1 data, the UE2 data, the UE3 data, the CI-1, the CI-2, and the CI-3.

In one exemplary embodiment, the BS 602 transmits the UE1-CI, the UE2-CI, and the UE3-CI to the RS 604 on the PDCCH and transmits data to the RS 604 on the PDSCH, in subframe N based on a subframe format 612. Based on the subframe format 612, the CI-1, the CI-2, and the CI-3 are aggregated in a dedicated resource block on the PDSCH.

In one exemplary embodiment, the BS 602 transmits the UE1-CI, the UE2-CI, and the UE3-CI to the RS 604 on the PDCCH and transmits data to the RS 604 on the PDSCH, in subframe N based on a subframe format 614. Based on the subframe format 614, the data on the PDSCH includes the UE1 data, the UE2 data, and the UE3 data, and the CI-1, the CI-2, and the CI-3 are transmitted on the PDCCH.

Similar to the above description, in a subframe transmitted after subframe N, e.g., subframe N+X (not shown), the BS 602 may transmit the CI-1, the CI-2, and the CI-3 to UE1, UE2, and UE3 on the PDCCH, respectively, and the RS 604 may transmit the UE1 data, the UE2 data, and the UE3 data to UE1, UE2, and UE3 on the PDSCH, respectively. As a result, UE1, UE2, and UE3 may receive the data relayed from the RS 604.

Figure 7:
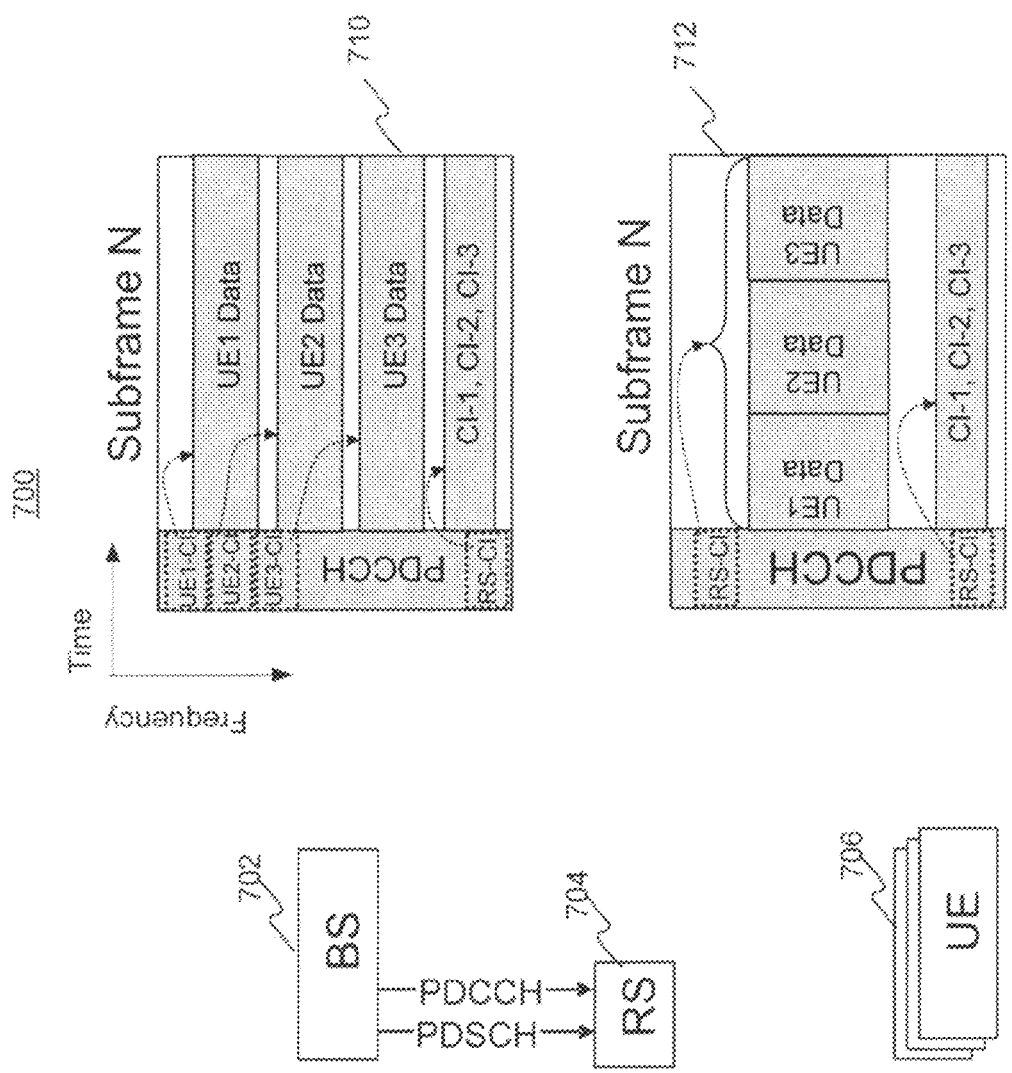
FIG. 7 illustrates a relay transmission process for a relay station to relay data received from a base station to user equipment, according to an exemplary embodiment.

FIG. 7 illustrates a relay transmission process 700 for an RS 704 to relay data received from a BS 702 to UEs 706, according to an exemplary embodiment. For illustrative purposes only, it is assumed that the UEs 706 include a first UE UE1, a second UE UE2, and a third UE UE3. For example, the BS 702, the RS 704, and UE1 may be the BS 302, the RS 304, and the UE 306 (FIG. 3), respectively.

In exemplary embodiments, in subframe N based on a subframe format 710 or 712, the BS 702 separately transmits, i.e., transmits in different frequency bands or in different resource blocks, data to be relayed to UE1, UE2, and UE3, referred to herein as UE1 data, UE2 data, and UE3 data, respectively, and control information that indicates resource allocation for the RS 704 to relay the UE1 data, the UE2 data, and the UE3 data, referred to herein as CI-1, CI-2, and CI-3, respectively.

In exemplary embodiments, the BS 702 encodes control information that indicates resource allocation for the RS 704 to receive the CI-1, the CI-2, and the CI-3 with an RNTI of the RS 704, referred to herein as RS-CI. The BS 702 further transmits the RS-CI to the RS 704 on a PDCCH, and transmits the CI-1, the CI-2, and the CI-3 to the RS 704 on a PDSCH.

In one exemplary embodiment, based on the subframe format 710, the BS 702 encodes control information that indicates resource allocation for the RS 704 to receive the UE1 data, the UE2 data, and the UE3 data with respective RNTIs of UE1, UE2, and UE3, the control information being referred to herein as UE1-CI, UE2-CI, and UE3-CI, respectively. The BS 702 further transmits the UE1-CI, the UE2-CI, and the UE3-CI to the RS 704 on the PDCCH, and transmits the UE1 data, the UE2 data, and the UE3 data to the RS 704 on the PDSCH.

In one exemplary embodiment, based on the subframe format 712, the BS 702 encodes control information that indicates resource allocation for the RS 704 to receive the UE1 data, the UE2 data, and the UE3 with the RNTI of the RS, also referred to herein as RS-CI. The BS 702 further transmits the RS-CI to the RS 704 on the PDCCH, and transmits the UE1 data, the UE2 data, and the UE3 data to the RS 704 on the PDSCH.

Similar to the above description, in a subframe transmitted after subframe N, e.g., subframe N+X (not shown), the BS 702 may transmit the CI-1, the CI-2, and the CI-3 to UE1, UE2, and UE3 on the PDCCH, respectively, and the RS 704 may transmit the UE1 data, the UE2 data, and the UE3 data to UE1, UE2, and UE3 on the PDSCH, respectively. As a result, UE1, UE2, and UE3 may receive data relayed from the RS 704.

Figure 8:
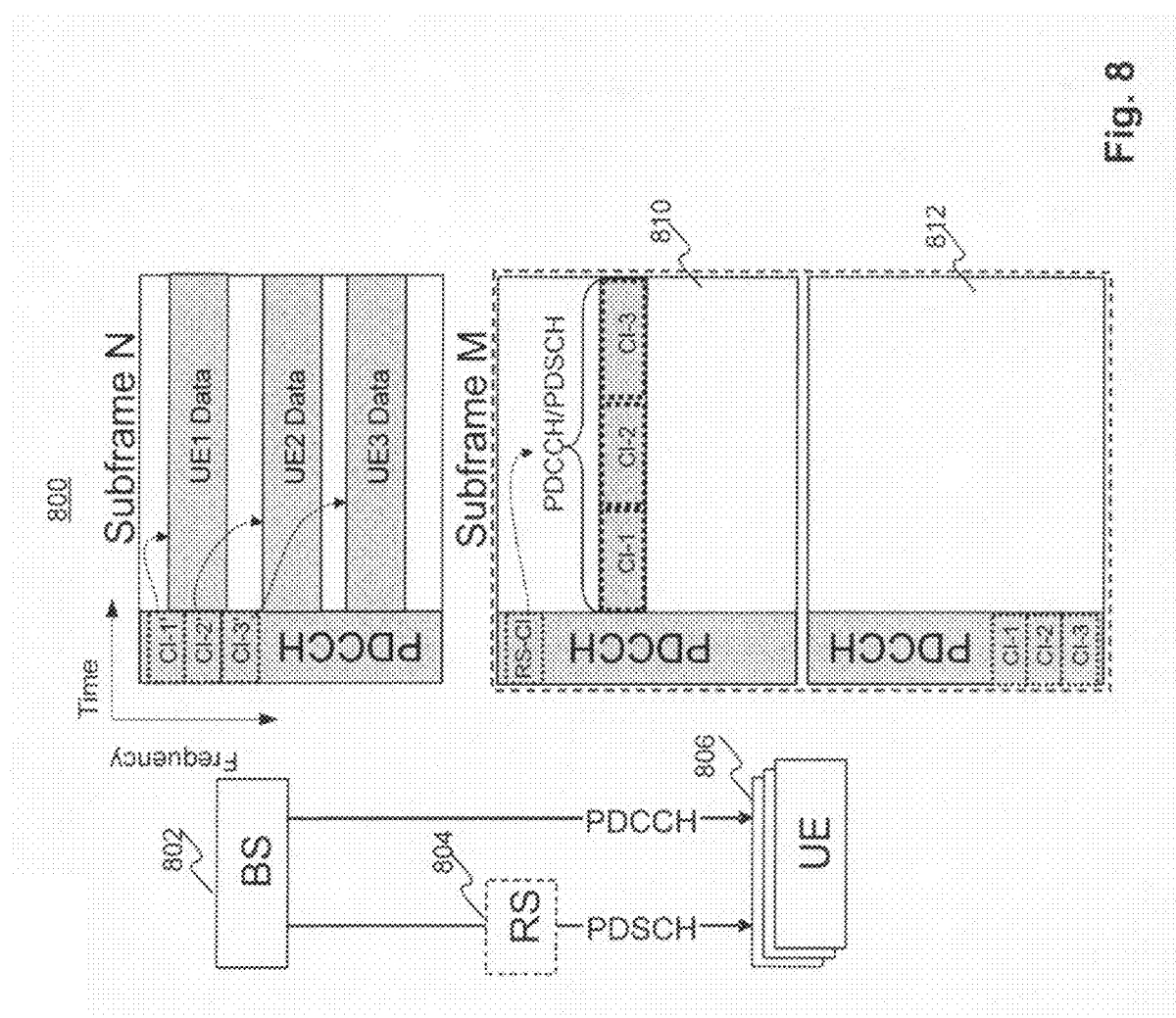
FIG. 8 illustrates a relay transmission process for a relay station to relay data received from a base station to user equipment, according to an exemplary embodiment.

FIG. 8 illustrates a relay transmission process 800 for an RS 804 to relay data received from a BS 802 to UEs 806, according to an exemplary embodiment. For illustrative purposes only, it is assumed that the UEs 806 include a first UE UE1, a second UE UE2, and a third UE UE3. For example, the BS 802, the RS 804, and UE1 may be the BS 302, the RS 304, and the UE 306 (FIG. 3), respectively.

In exemplary embodiments, in subframe N, the BS 802 transmits data to UE1, UE2, and UE3, referred to herein as UE1 data, UE2 data, and UE3 data, respectively, on a PDSCH. The BS 802 also encodes control information that indicates resource allocation for UE1, UE2, and UE3 to receive the UE1 data, the UE2 data, and the UE3 data, referred to herein as CI-1', CI-2', and CI-3', respectively, and transmits the CI-1', the CI-2', and the CI-3' on a PDCCH.

As described above, the RS 804 may obtain RNTIs of UE1, UE2, and UE3 through dedicated signaling from the BS 802 or by snooping messages exchanged between the BS 802 and each of UE1, UE2, and UE3. As a result, at the same time the BS 802 transmits the data and the control information to UE1, UE2, and UE3, the RS 804 may also receive the UE1 data, the UE2 data, and the UE3 data based on the RNTIs of UE1, UE2, and UE3, respectively.

In exemplary embodiments, UE1, UE2, and UE3 may not correctly receive the data transmitted in subframe N, and therefore request the BS 802 to retransmit the data. Accordingly, in subframe M, the BS 802 transmits to the RS 804 control information that indicates resource allocation for the RS 804 to relay the UE1 data, the UE2 data, and the UE3 data, referred to herein as CI-1, CI-2, and CI-3, respectively. It is to be understood that subframe M may also be transmitted before subframe N is transmitted.

In one exemplary embodiment, based on a subframe format 810, the BS 802 encodes the control information that indicates resource allocation for the RS 804 to receive the CI-1, the CI-2, and the CI-3 with an RNTI of the RS 804, referred to herein as RS-CI. The BS 802 further transmits the RS-CI to the RS 804 on the PDCCH and transmits the CI-1, the CI-2, and the CI-3 to the RS 804 on the PDCCH or the PDSCH. In one exemplary embodiment, based on a subframe format 812, the BS 802 directly transmits the CI-1, the CI-2, and the CI-3 to the RS 804 on the PDCCH.

Similar to the above description, in a subframe transmitted after subframe N, e.g., subframe N+X (not shown), the BS 802 may transmit the CI-1, the CI-2, and the CI-3 to UE1, UE2, and UE3 on the PDCCH, respectively, and the RS 804 may transmit the UE1 data, the UE2 data, and the UE3 data to UE1, UE2, and UE3 on the PDSCH, respectively. As a result, UE1, UE2, and UE3 may receive data retransmitted from the RS 804.

Figure 9:
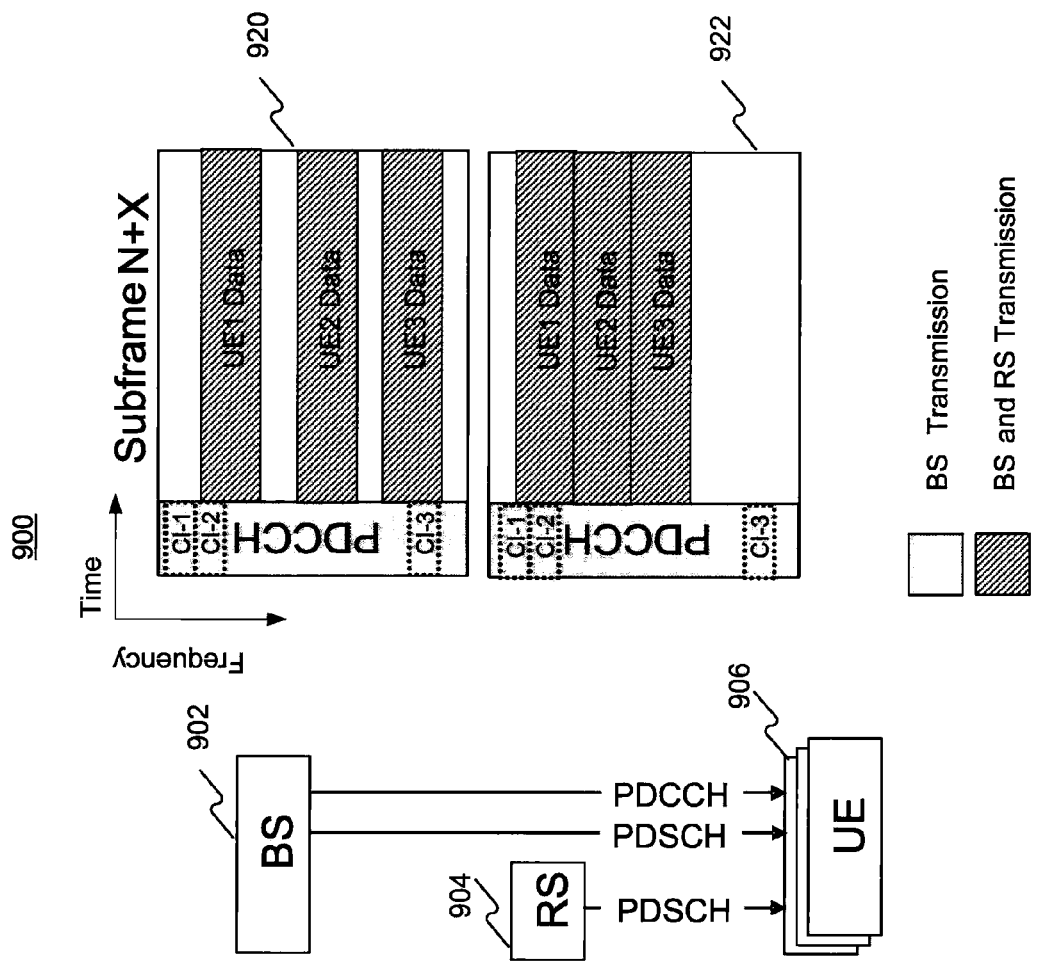
FIG. 9 illustrates a relay transmission process for a relay station to relay data received from a base station to user equipment, according to an exemplary embodiment.

FIG. 9 illustrates a relay transmission process 900 for an RS 904 to relay data received from a BS 902 to UEs 906, according to an exemplary embodiment. For illustrative purposes only, it is assumed that the UEs 906 include a first UE UE1, a second UE UE2, and a third UE UE3. For example, the BS 902, the RS 904, and UE1 may be the BS 302, the RS 304, and the UE 306 (FIG. 3), respectively.

In exemplary embodiments, in subframe N, the BS 902 transmits to the RS 904 data to be relayed to UE1, UE2, and UE3, referred to herein as UE1 data, UE2 data, and UE3 data, respectively, and control information that indicates resource allocation for relaying the UE1 data, the UE2 data, and the UE3 data, referred to herein as CI-1, CI-2, and CI-3, respectively, similar to the above description in connection with FIGS. 5-8.

In exemplary embodiments, in a subframe transmitted after subframe N, e.g., subframe N+X, the BS 902 may transmit the CI-1, the CI-2, and the CI-3 to UE1, UE2, and UE3 on the PDCCH, respectively. In addition, the BS 902 and the RS 904 may simultaneously transmit the UE1 data, the UE2 data, and the UE3 data to UE1, UE2, and UE3 on the PDSCH, respectively. As a result, UE1, UE2, and UE3 may simultaneously receive data from the BS 902 and RS 904. FIG. 9 shows exemplary subframe formats 920 and 922 for subframe N+X.

In exemplary embodiments, a BS may transmit control information indicating resource allocation for an RS and control information indicating resource allocation for a UE in a same resource block. To prevent the UE from incorrectly receiving the control information for the RS, the BS may transmit the control information based on an RS specific indication message or encoding methods for blind decoding.

FIG. 10 illustrates an RS specific indication message 1000 for a BS to transmit control information to an RS, according to an exemplary embodiment. Referring to FIG. 10, the RS specific indication message 1000 may include one or more of the following parameters: a format type indicating the message 1000 is for use by an RS; a UE identifier specifying the UE to which data is to be relayed, e.g., an RNTI, a logical channel identification (LCID), or a connection ID of the UE; a subframe index indicating the subframe for relay transmission; a resource block (RB) assignment indicating a resource allocation; a modulation and coding scheme (MCS) indicating the MCS to be used; a redundancy version; a new data indicator for use in a hybrid automatic request (HARQ) process; a transmission power control (TPC) command for data; a preamble index; and other parameters shown in FIG. 10. These other parameters are well-known in the art and will not be described further.

In exemplary embodiments, the RS specific indication message 1000 may be included in a MAC header, a control element, a message, an RLC message, or an RRC message.

FIG. 11 illustrates an encoding method 1100 for a BS to transmit control information to an RS and a UE, according to an exemplary embodiment. As described above, the BS may encode control information, in forms of a plurality of pieces of downlink control information (DCIs), into multiple control channel elements (CCEs). If the BS encodes the DCIs for the RS into a first number of CCEs, and encodes the DCIs for the UE into a second number of CCEs different from the first number, the UE may not correctly decode the DCIs for the RS, and only the RS may correctly decode the DCIs for the RS.

More particularly, as shown in FIG. 11, a DCI for the RS and a DCI for the UE may be encoded into different numbers of CCEs. For example, the DCI for the UE may be encoded into 1/2/4/8 CCEs, while the DCI for the RS may be encoded into 3/5/6/7 CCEs. As a result, the DCI for the RS and the DCI for the UE may be transmitted in the same resource block on, e.g., the PDCCH, and the UE may not correctly decode the DCI for the RS. FIG. 11 also shows exemplary values of parameters corresponding to the different numbers of CCEs, such as a PDCCH length type, a number of resource element groups, and a number of PDCCH bits. These parameters are well-known in the art and will not be described further.

In exemplary embodiments, a DCI for the RS and a DCI for the UE may also be encoded into the same number of CCEs, e.g., 2 CCEs, if these DCIs are to be transmitted in different subframes or different resource blocks.

Figure 12:
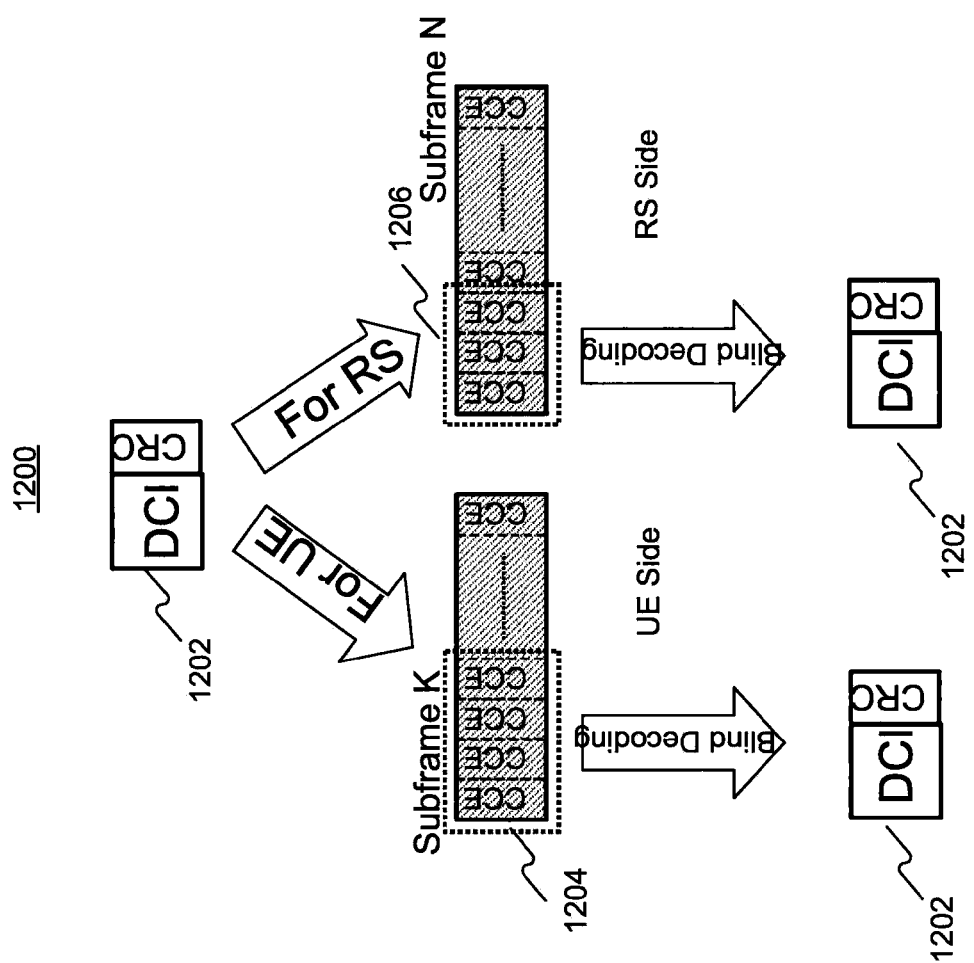
FIG. 12 illustrates a process for a base station to transmit control information to a relay station and user equipment, according to an exemplary embodiment.

FIG. 12 illustrates a process 1200 for a BS to transmit control information to an RS and a UE based on the method 1100 (FIG. 11), according to an exemplary embodiment. For example, the BS transmits the same control information as a DCI 1202 appended with cyclic redundancy check (CRC) parity bits.

Figure 1:
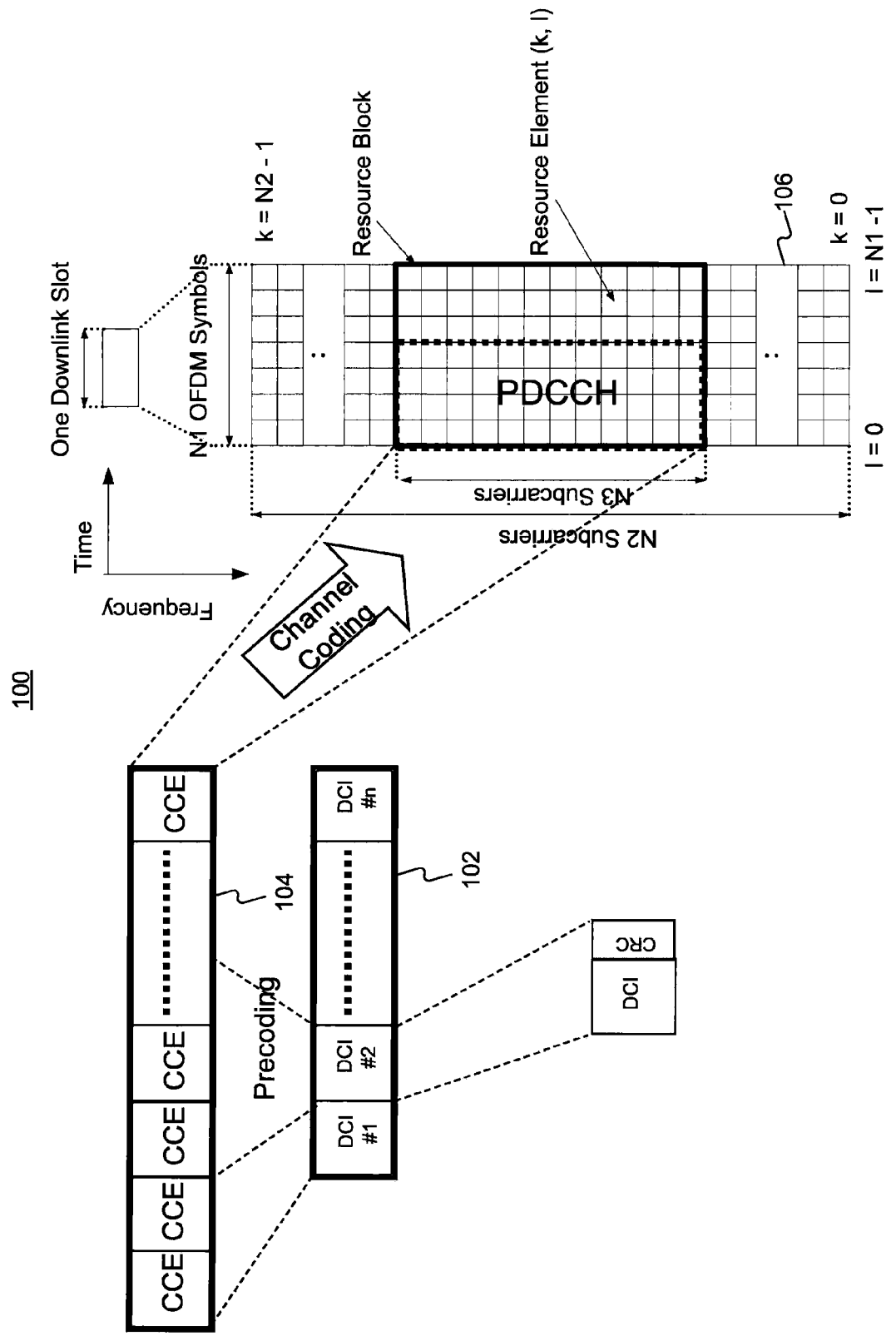
FIG. 1 illustrates a traditional method for a base station to transmit control information to a relay station or user equipment, according to the LTE standard.
Figure 2:
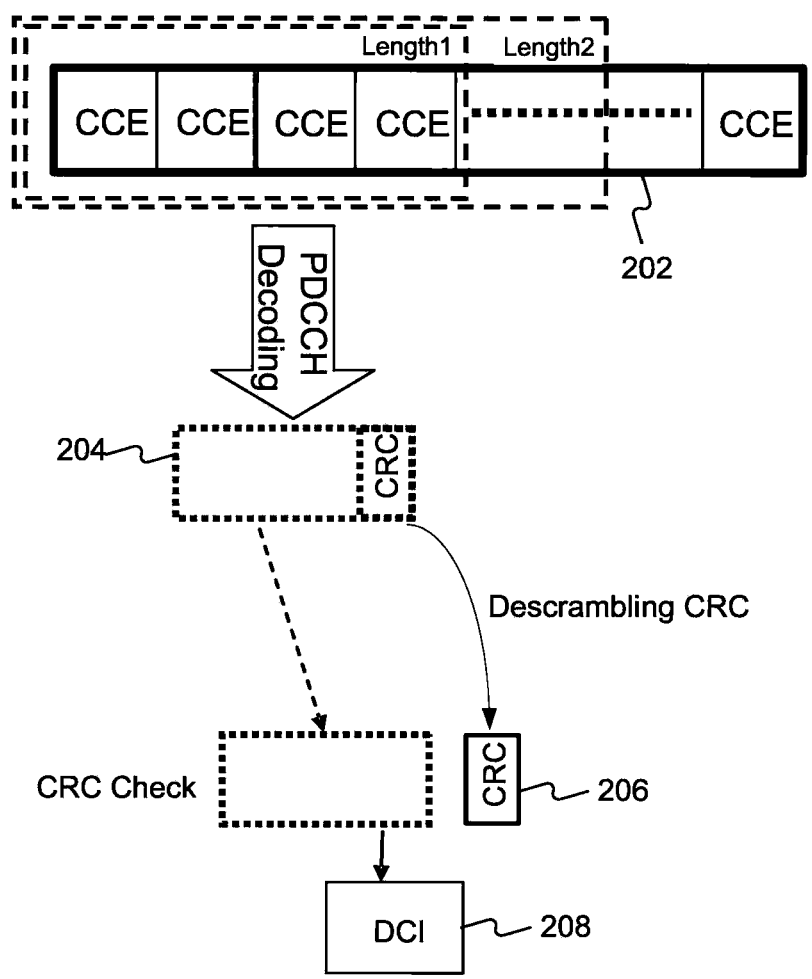
FIG. 2 illustrates a traditional method for a relay station or user equipment to receive control information from a base station, according to the LTE standard.

Referring to FIG. 12, the BS encodes the DCI 1202 into a first number of CCEs 1204, e.g., 4 CCEs, for transmitting to the UE in subframe K, and encodes the DCI 1202 into a second number of CCEs 1206, e.g., 3 CCEs, for transmitting to the RS in subframe N. On the UE side, the UE may use the blind decoding method 200 (FIG. 2) to decode the CCEs 1204 based on different numbers of CCEs that are assigned for use by the UE. On the RS side, the RS may also use the blind decoding method 200 (FIG. 2) to decode the CCEs 1206 based on different numbers of CCEs that are assigned for use by the RS. As a result, the UE and the RS may decode the CCEs 1204 and the CCEs 1206, respectively, and receive the DCI 1202 after CRC. In exemplary embodiments, the BS may also transmit the CCEs 1204 and the CCEs 1206 in a same subframe.

Figure 13:
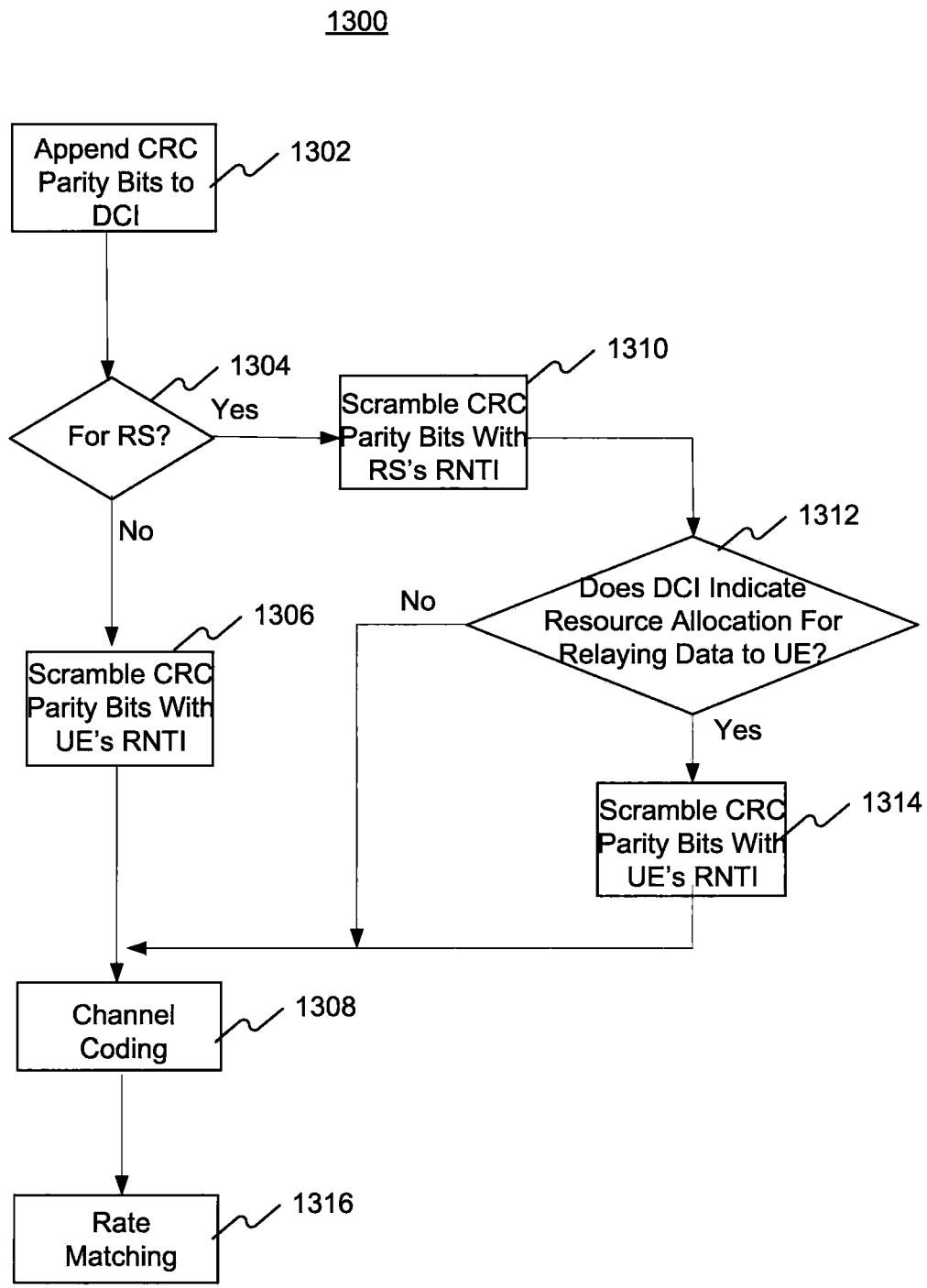
FIG. 13 illustrates an encoding method for a base station to transmit control information to a relay station and user equipment, according to an exemplary embodiment.

FIG. 13 illustrates an encoding method 1300 for a BS to transmit control information to an RS and a UE, according to an exemplary embodiment. Referring to FIG. 13, the BS appends CRC parity bits to a DCI (1302) and determines if the DCI is to be transmitted to the RS (1304). If the BS determines that the DCI is not to be transmitted to the RS but to the UE (1304—No), the BS scrambles the CRC parity bits with an identification of the UE, e.g., an RNTI of the UE (1306), and further performs channel coding on the DCI to generate coded signals (1308). When the UE receives the DCI with the scrambled CRC parity bits, the UE may successfully receive the DCI by using its own RNTI to descramble the CRC parity bits.

If the BS determines that the DCI is to be transmitted to the RS (1304—Yes), the BS scrambles the CRC parity bits with an identification of the RS, e.g., an RNTI of the RS (1310). The BS further determines if the DCI indicates resource allocation for relaying data to the UE (1312). If the BS determines that the DCI indicates resource allocation for relaying data to the UE (1312—Yes), the BS further scrambles the CRC parity bits with the RNTI of the UE (1314). Otherwise (1312—No), the BS performs channel coding on the DCI to generate coded signals (1308). The BS may also perform rate matching on the coded signals (1316). When the RS receives the DCI with the scrambled CRC parity bits, the RS may successfully receive the DCI by using its own RNTI and/or the RNTI of the UE to descramble the CRC parity bits.

Figure 14:
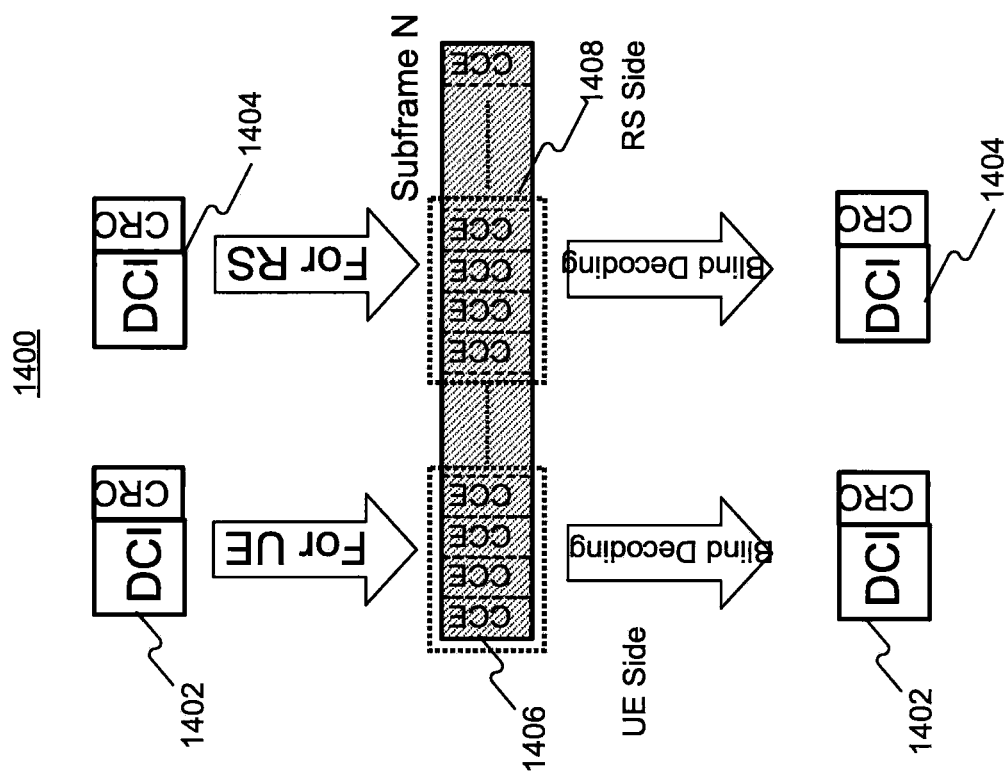
FIG. 14 illustrates a process for a base station to transmit control information to a relay station and user equipment, according to an exemplary embodiment.

FIG. 14 illustrates a process 1400 for a BS to transmit control information to an RS and a UE, according to an exemplary embodiment. For example, the BS may transmit control information for the UE as a DCI 1402 appended with CRC parity bits, and control information for the RS as a DCI 1404 appended with CRC parity bits.

Referring to FIG. 14, the BS encodes the DCI 1402 into a number of CCEs 1406, e.g., 4 CCEs, for transmitting to the UE, and encodes the DCI 1404 into the same number of CCEs 1408, i.e., 4 CCEs, for transmitting to the RS. The BS further transmits the CCEs 1406 and the CCEs 1408 in different frequency resources. On the UE side, the UE may use the blind decoding method 200 (FIG. 2) to decode the CCEs 1406, and on the RS side, the RS may also use the blind decoding method 200 (FIG. 2) to decode the CCEs 1408. As a result, the UE and the RS may decode the CCEs 1406 and the CCEs 1408, respectively, and receive the DCI 1402 and the DCI 1404 after CRC.

In one exemplary embodiment, the BS transmits the CCEs 1406 and the CCEs 1408 in a same subframe N. Because the BS may scramble the CRC parity bits of the UE and the RS using their respective RNTIs, as explained in FIG. 13, the UE and the RS may correctly decode the CCEs 1406 and the CCEs 1408, respectively.

Figure 15:
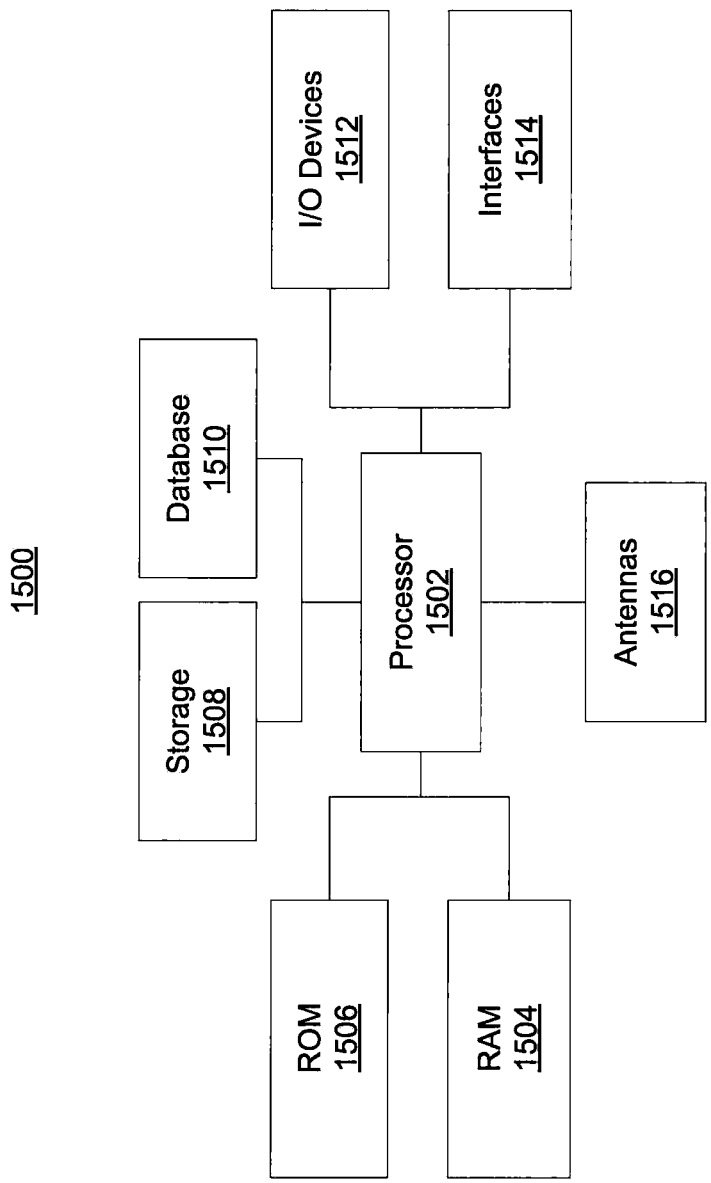
FIG. 15 illustrates a block diagram of a base station, according to an exemplary embodiment.

FIG. 15 illustrates a block diagram of a BS 1500, according to an exemplary embodiment. For example, the BS 1500 may be any of the BSs described above in FIGS. 3-14. Referring to FIG. 15, the BS 1500 may include one or more of the following components: a processor 1502 configured to execute computer program instructions to perform various processes and methods, random access memory (RAM) 1504 and read only memory (ROM) 1506 configured to access and store information and computer program instructions, storage 1508 to store data and information, databases 1510 to store tables, lists, or other data structures, I/O devices 1512, interfaces 1514, antennas 1516, etc. Each of these components is well-known in the art and will not be discussed further.

Figure 16:
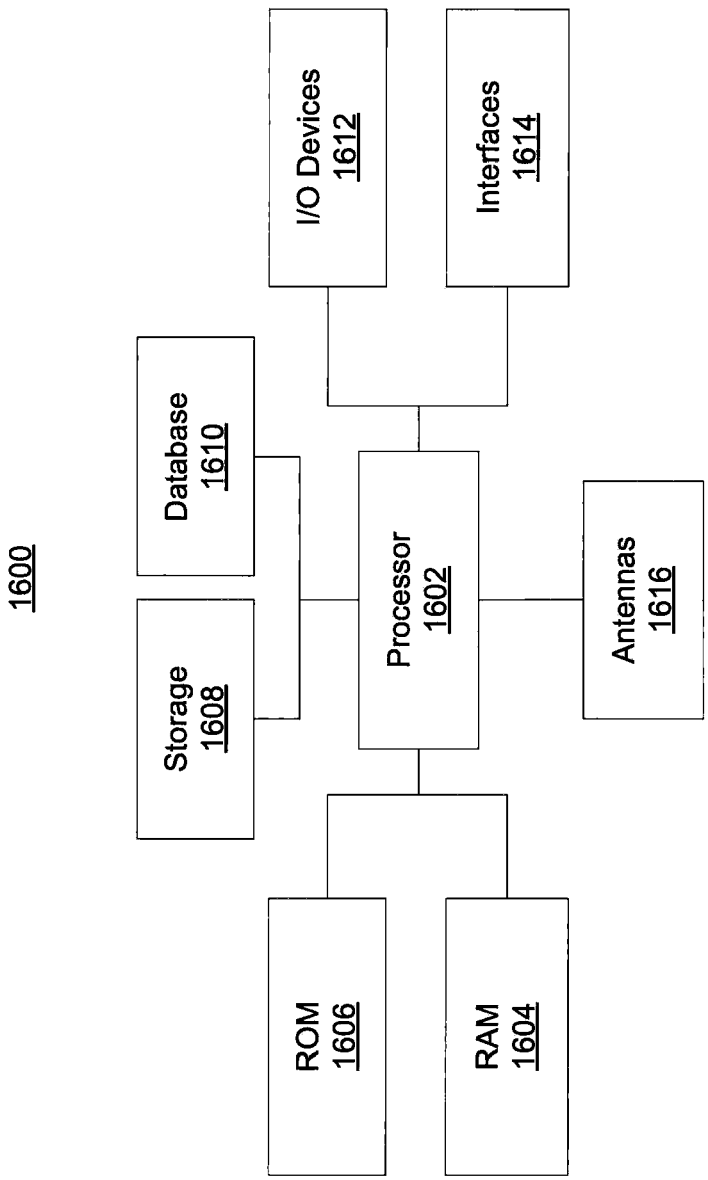
FIG. 16 illustrates a block diagram of a relay station, according to an exemplary embodiment.

FIG. 16 illustrates a block diagram of an RS 1600, according to an exemplary embodiment. For example, the RS 1600 may be any of the RSs described above in FIGS. 3-14. Referring to FIG. 16, the RS 1600 may include one or more of the following components: a processor 1602 configured to execute computer program instructions to perform various processes and methods, random access memory (RAM) 1604 and read only memory (ROM) 1606 configured to access and store information and computer program instructions, storage 1608 to store data and information, databases 1610 to store tables, lists, or other data structures, I/O devices 1612, interfaces 1614, antennas 1616, etc. Each of these components is well-known in the art and will not be discussed further.

Figure 17:
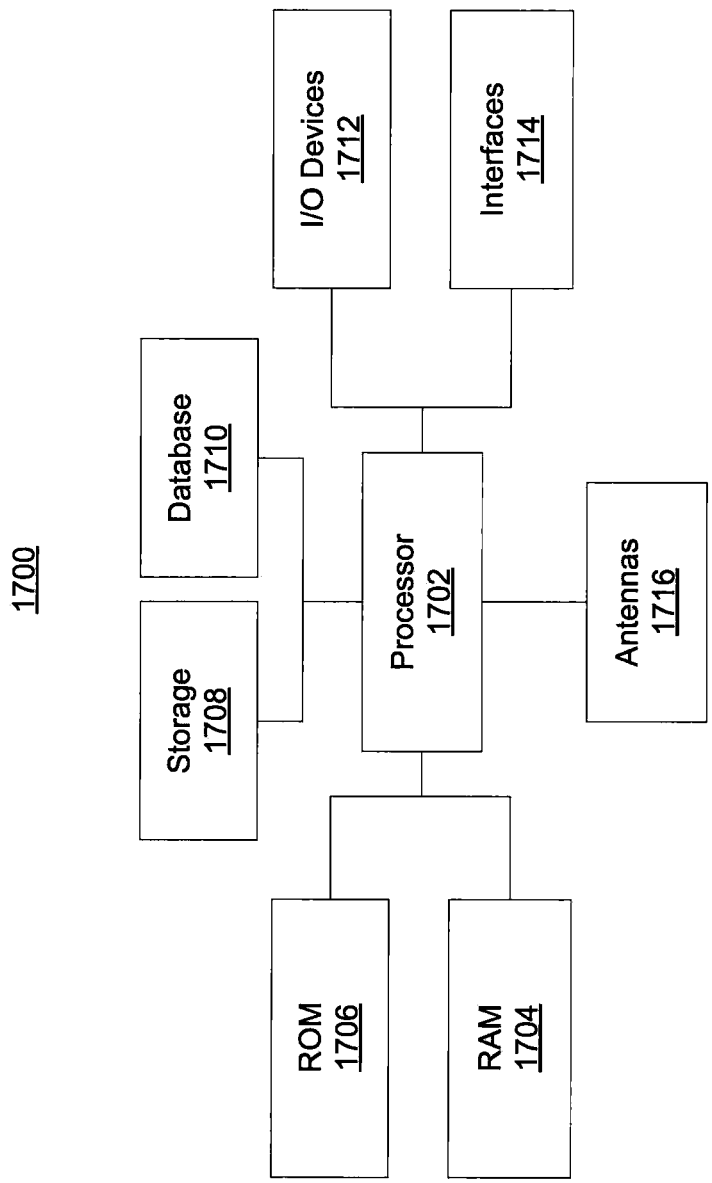
FIG. 17 illustrates a block diagram of user equipment, according to an exemplary embodiment.

FIG. 17 illustrates a block diagram of UE 1700, according to an exemplary embodiment. For example, the UE 1700 may be any of the UEs described above in FIGS. 3-14. Referring to FIG. 17, the UE 1700 may include one or more of the following components: a processor 1702 configured to execute computer program instructions to perform various processes and methods, random access memory (RAM) 1704 and read only memory (ROM) 1706 configured to access and store information and computer program instructions, storage 1708 to store data and information, databases 1710 to store tables, lists, or other data structures, I/O devices 1712, interfaces 1714, antennas 1716, etc. Each of these components is well-known in the art and will not be discussed further.

While embodiments have been described based on the LTE standard, the invention is not so limited. It may be practiced with equal effectiveness with other communication standards.

While embodiments have been described based on downlink transmission, e.g., data transmission from a BS to an RS or to UE, the invention is not so limited. It may be practiced with equal effectiveness with uplink transmission, e.g., data transmission from UE to a BS or to an RS.

Other embodiments of the invention will be apparent to those skilled in the art from consideration of the specification and practice of the embodiments disclosed herein. The scope of the invention is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for a base station to transmit control information to a relay station and to user equipment, comprising:
   encoding, by the base station, first downlink control information appended with a first plurality of cyclic redundancy check (CRC) bits into a first group of control channel elements (CCEs), the first downlink control information indicating resource allocation for the relay station, wherein the first group of CCEs comprises one of 3 CCEs, 5 CCEs, 6 CCEs, and 7 CCEs;

encoding, by the base station, second downlink control information appended with a second plurality of CRC bits into a second group of CCEs, the second downlink control information indicating resource allocation for the user equipment, wherein the second group of CCEs comprises one of 1 CCE, 2 CCEs, 4 CCEs, and 8 CCEs;

transmitting, by the base station, the encoded first downlink control information and the encoded second downlink control information in a same subframe.

2. The method of claim 1, wherein the transmitting comprises:
   transmitting the encoded first downlink control information for the relay station to perform blind decoding to decode the first group of CCEs; and
   transmitting the encoded second downlink control information for the user equipment to perform blind decoding to decode the second group of CCEs.

3. The method of claim 1, wherein the encoded first downlink control information and the encoded second downlink control information are transmitted on a physical downlink control channel (PDCCH) in the subframe.

4. The method of claim 1, wherein the encoding of the first and second downlink control information comprises:
   encoding the first downlink control information into the first group of CCEs; and
   encoding the first downlink control information into the second group of CCEs, the second group of CCEs being different from the first group of CCEs.

5. The method of claim 1, further comprising:
   receiving, by the relay station, the encoded first downlink control information and the encoded second downlink control information;
   decoding, by the relay station, the encoded first downlink control information to obtain data to be relayed to the user equipment;
   decoding, by the relay station, the encoded second downlink control information to obtain resources allocated for the user equipment; and
   transmitting, by the relay station, the data to the user equipment on the resources allocated for the user equipment.

6. The method of claim 5, wherein the receiving comprises:
   receiving the first encoded control information for the relay station on a physical downlink control channel (PDCCH).

7. The method of claim 5, wherein the receiving comprises:
   receiving the second encoded control information for the user equipment on a physical downlink shared channel (PDSCH).

8. The method of claim 1, further comprising:
   receiving, by the relay station, the first encoded downlink control information in a first subframe, wherein the first subframe includes the second encoded downlink control information; and
   receiving, by the relay station, third downlink control information in a third subframe without receiving fourth downlink control information in a second subframe between the first subframe and the third subframe, wherein the second subframe includes the fourth downlink control information for the user equipment, and the third downlink control information and the fourth downlink control information are encoded by the base station.

9. A method for a base station to transmit control information to a relay station and to user equipment, comprising:
   encoding, by the base station, first downlink control information into a first group of control channel elements (CCEs), the first downlink control information indicating resource allocation for the relay station, wherein the first group of CCEs comprises one of 3 CCEs, 5 CCEs, 6 CCEs, and 7 CCEs;
   encoding, by the base station, second downlink control information into a second group of CCEs, the second downlink control information indicating resource allocation for the user equipment, wherein the second group of CCEs comprises one of 1 CCE, 2 CCEs, 4 CCEs, and 8 CCEs;
   transmitting, by the base station, the encoded first downlink control information in a first subframe, for the relay station to decode the first group of CCEs using a first parameter value associated with the relay station; and
   transmitting, by the base station, the encoded second downlink control information in a second subframe, for the user equipment to decode the second group of CCEs using a second parameter value associated with the user equipment, wherein the second subframe includes no downlink control information indicating resource allocation for the relay station.

10. The method of claim 9, wherein the first parameter value and the second parameter value are different values of a physical downlink control channel (PDCCH) length type.

11. The method of claim 9, wherein the first parameter value and the second parameter value are different values of a number of CCEs.

12. The method of claim 9, wherein the first parameter value and the second parameter value are different values of a number of resource element groups.

13. The method of claim 9, wherein the first parameter value and the second parameter value are different values of a number of physical downlink control channel (PDCCH) bits.

14. The method of claim 9, wherein the encoded first downlink control information and the encoded second downlink control information are transmitted on first and second resource blocks, respectively.

15. The method of claim 9, wherein the second subframe includes no downlink control information indicating resource allocation for the relay station.

16. The method of claim 15, further comprising: generating the first subframe and the second subframe in different formats.

17. The method of claim 15, further comprising: transmitting the encoded second downlink control information to the user equipment on a physical downlink shared channel (PDSCH) in the first subframe.

18. The method of claim 15, further comprising: transmitting the encoded second downlink control information to the user equipment on a physical downlink control channel (PDCCH) in the first subframe.

19. A base station to transmit control information to a relay station and to user equipment, the base station comprising:
   a processor; and
   a memory for storing instructions executable by the processor;
   wherein the processor is configured to:
   encode first downlink control information appended with a first plurality of cyclic redundancy check (CRC) bits into a first group of control channel elements (CCEs), the first downlink control information indicating resource allocation for the relay station, wherein the first group of CCEs comprises one of 3 CCEs, 5 CCEs, 6 CCEs, and 7 CCEs;

encode second downlink control information appended with a second plurality of CRC bits into a second group of CCEs, the second downlink control information indicating resource allocation for the user equipment, wherein the second group of CCEs comprises one of 1 CCE, 2 CCEs, 4 CCEs, and 8 CCEs; and transmit the encoded first downlink control information and the encoded second downlink control information in a same subframe.

20. The base station of claim 19, wherein the processor is further configured to:

transmit the encoded first downlink control information for the relay station to perform blind decoding to decode the first group of CCEs; and transmit the encoded second downlink control information for the user equipment to perform blind decoding to decode the second group of CCEs.

21. The base station of claim 19, wherein the encoded first downlink control information and the encoded second downlink control information are transmitted on a physical downlink control channel (PDCCH) in the subframe.

22. The base station of claim 19, wherein the processor is further configured to:

encode the first downlink control information into the first group of CCEs; and encode the first downlink control information into the second group of CCEs, the second group of CCEs being different from the first group of CCEs.

23. The base station of claim 19, wherein the relay station is configured to:

receive, from the base station, the encoded first downlink control information and the encoded second downlink control information;

decode the encoded first downlink control information to obtain data to be relayed to the user equipment;

decode the encoded second downlink control information to obtain resources allocated for the user equipment; and transmit the data to the user equipment on the resources allocated for the user equipment.

24. The base station of claim 23, wherein the relay station is further configured to:

receive the first encoded control information for the relay station on a physical downlink control channel (PDCCH).

25. The base station of claim 23, wherein the relay station is further configured to:

receive the second encoded control information for the user equipment on a physical downlink shared channel (PDSCH).

26. The base station of claim 19, wherein the relay station is configured to:

receive the first encoded downlink control information in a first subframe, wherein the first subframe includes the second encoded downlink control information; and receive third downlink control information in a third subframe without receiving fourth downlink control information in a second subframe between the first subframe and the third subframe, wherein the second subframe includes the fourth downlink control information for the user equipment, and the third downlink control information and the fourth downlink control information are encoded by the base station.

27. A base station to transmit control information to a relay station and to user equipment, the base station comprising:

a processor; and a memory for storing instructions executable by the processor;

wherein the processor is configured to:

encode first downlink control information into a first group of control channel elements (CCEs), the first downlink control information indicating resource allocation for the relay station, wherein the first group of CCEs comprises one of 3 CCEs, 5 CCEs, 6 CCEs, and 7 CCEs;

encode second downlink control information into a second group of CCEs, the second downlink control information indicating resource allocation for the user equipment, wherein the second group of CCEs comprises one of 1 CCE, 2 CCEs, 4 CCEs, and 8 CCEs;

transmit the encoded first downlink control information in a first subframe, for the relay station to decode the first group of CCEs using a first parameter value associated with the relay station; and transmit the encoded second downlink control information in a second subframe, for the user equipment to decode the second group of CCEs using a second parameter value associated with the user equipment, wherein the second subframe includes no downlink control information indicating resource allocation for the relay station.

28. The base station of claim 27, wherein the first parameter value and the second parameter value are different values of a physical downlink control channel (PDCCH) length type.

29. The base station of claim 27, wherein the first parameter value and the second parameter value are different values of a number of CCEs.

30. The base station of claim 27, wherein the first parameter value and the second parameter value are different values of a number of resource element groups.

31. (The base station of claim 27, wherein the first parameter value and the second parameter value are different values of a number of physical downlink control channel (PDCCH) bits.

32. The base station of claim 27, wherein the encoded first downlink control information and the encoded second downlink control information are transmitted on first and second resource blocks, respectively.

33. The base station of claim 27, wherein the second subframe includes no downlink control information indicating resource allocation for the relay station.

34. The base station of claim 33, wherein the processor is further configured to generate the first subframe and the second subframe in different formats.

35. The base station of claim 33, wherein the processor is further configured to transmit the encoded second downlink control information to the user equipment on a physical downlink shared channel (PDSCH) in the first subframe.

36. The base station of claim 33, wherein the processor is further configured to transmit the encoded second downlink control information to the user equipment on a physical downlink control channel (PDCCH) in the first subframe.

* * * * *